(12) United States Patent
Pane

(10) Patent No.: US 11,374,816 B2
(45) Date of Patent: Jun. 28, 2022

(54) DYNAMIC NETWORK CONFIGURATION DURING DEVICE INSTALLATION

(71) Applicant: Biamp Systems, LLC, Beaverton, OR (US)

(72) Inventor: Christopher Pane, Fairport, NY (US)

(73) Assignee: Biamp Systems, LLC, Beaverton, OR (US)

( * ) Notice: Subject to any disclaimer, the term of this patent is extended or adjusted under 35 U.S.C. 154(b) by 89 days.

(21) Appl. No.: 16/782,001

(22) Filed: Feb. 4, 2020

(65) Prior Publication Data

US 2020/0252286 A1    Aug. 6, 2020

Related U.S. Application Data

(60) Provisional application No. 62/800,849, filed on Feb. 4, 2019.

(51) Int. Cl.
| | |
|---|---|
| *H04L 41/0873* | (2022.01) |
| *H04L 41/0806* | (2022.01) |
| *H04L 41/0853* | (2022.01) |
| *H04L 41/06* | (2022.01) |
| *H04L 41/12* | (2022.01) |
| *H04L 41/0813* | (2022.01) |
| *H04L 43/0823* | (2022.01) |
| *H04L 43/06* | (2022.01) |
| *H04L 41/0654* | (2022.01) |

(52) U.S. Cl.
CPC .......... *H04L 41/0873* (2013.01); *H04L 41/06* (2013.01); *H04L 41/0654* (2013.01); *H04L 41/0806* (2013.01); *H04L 41/0813* (2013.01); *H04L 41/0853* (2013.01); *H04L 41/12* (2013.01); *H04L 43/06* (2013.01); *H04L 43/0823* (2013.01)

(58) Field of Classification Search
CPC . H04L 41/0873; H04L 41/06; H04L 41/0806; H04L 41/0853; H04L 41/12
See application file for complete search history.

(56) References Cited

U.S. PATENT DOCUMENTS

| | | | | |
|---|---|---|---|---|
| 6,810,452 | B1* | 10/2004 | James | H04L 12/2803 710/104 |
| 8,069,328 | B2* | 11/2011 | Pyeon | G11C 7/20 711/170 |
| 8,254,253 | B2 | 8/2012 | Forssell | |
| 8,588,236 | B2* | 11/2013 | Okita | H04L 41/0806 370/395.53 |
| 9,407,685 | B2* | 8/2016 | Rezvani | G06F 3/04847 |

* cited by examiner

*Primary Examiner* — Esther B. Henderson

(57) ABSTRACT

One example method of operation may include receiving at a managing device an indication whether a first network device is a known network device, identifying a selected network mode of operation stored in memory of the managing device, and determining whether to cancel the selected network mode of operation based on whether the first network device is a known device.

11 Claims, 11 Drawing Sheets

Daisy Chain

Redundant

Media Isolation

600

US 11,374,816 B2

DYNAMIC NETWORK CONFIGURATION DURING DEVICE INSTALLATION

FIELD OF THE INVENTION

This application relates to a device network configuration and more particularly to a dynamic network device configuration during device installation.

BACKGROUND OF THE INVENTION

Audio product installation requires numerous devices both on the output or presentation end of the installation and with respect to the control center that is responsible for managing the signals that are sent to the audio devices.

Enterprise working environments may include a speaker or set of speakers which are hung from a suspended ceiling, some speakers may integrate a microphone into a common housing. The speakers are wired to a control unit that may include a controller device, an amplifier, wire configurations, etc. Conventionally, a network device has two network ports that can have their functionality dynamically configured at runtime. For example, Ethernet ports can be configured to operate as a two-port Ethernet switch, including, for example, two redundant Ethernet ports, or in a media isolation configuration which isolates the media traffic from the regular Ethernet control traffic. These port configurations can be setup during installation, however, such a setup configuration still requires knowledge about the configuration and the devices by an expert network engineer.

SUMMARY OF THE INVENTION

The present application relates to a method including one or more operations of receiving at a managing device an indication whether a first network device is a known network device, identifying a selected network mode of operation stored in memory of the managing device, and determining whether to cancel the selected network mode of operation based on whether the first network device is a known device.

Another example embodiment may include an apparatus that includes a receiver configured to receive at a managing device an indication whether a first network device is a known network device, a processor configured to identify a selected network mode of operation stored in memory of the managing device, and determine whether to cancel the selected network mode of operation based on whether the first network device is a known device.

Still another example embodiment may include a non-transitory computer readable storage medium configured to store instructions that when executed cause a processor to perform receiving at a managing device an indication whether a first network device is a known network device, identifying a selected network mode of operation stored in memory of the managing device, and determining whether to cancel the selected network mode of operation based on whether the first network device is a known device.

Yet another example embodiment may include determining a network mode of operation designated by a managing device communicatively coupled to a plurality of network devices, identifying whether one or more of the plurality of network devices are violating one or more compliance measures associated with the network mode of operation, determining via the managing device whether to accept the network configuration or reject the network configuration based on whether one or more of the compliance measures are violated.

Still yet a further example embodiment may include an apparatus that includes a processor configured to determine a network mode of operation designated by a managing device communicatively coupled to a plurality of network devices, identify whether one or more of the plurality of network devices are violating one or more compliance measures associated with the network mode of operation, and determine via the managing device whether to accept the network configuration or reject the network configuration based on whether one or more of the compliance measures are violated.

Still yet another example embodiment may include a non-transitory computer readable storage medium configured to store instructions that when executed cause a processor to perform determining a network mode of operation designated by a managing device communicatively coupled to a plurality of network devices, identifying whether one or more of the plurality of network devices are violating one or more compliance measures associated with the network mode of operation, and determining via the managing device whether to accept the network configuration or reject the network configuration based on whether one or more of the compliance measures are violated.

DETAILED DESCRIPTION

Example embodiments include a device configuration for a network of devices which may include integrated wall or ceiling mountable network elements, which can provide audio functions, microphone detection, and other sensor, functions, lighting, feedback signals, etc. The device(s) may be part of a network of devices which are centrally controlled and managed to offer media services, and which may be controlled by feedback information used to perform beamforming computations which control the speaker volume of any one or more of the network elements in a particular environment.

Figure 1:
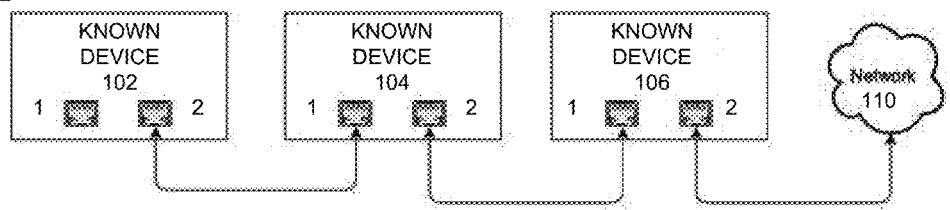
FIG. 1 illustrates three different network configurations according to example embodiments.
Figure 1:
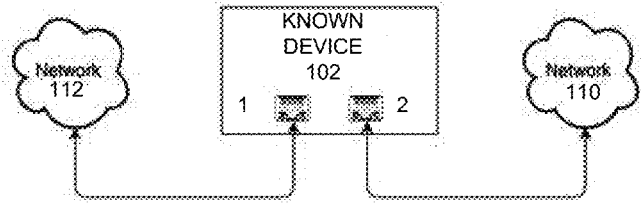
Figure 1:
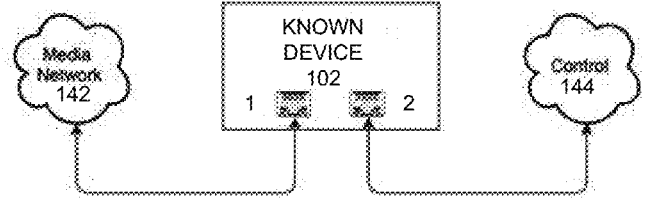

FIG. 1 illustrates three different network configurations according to example embodiments. The various network configurations are based on the three different two-port configurations supported by each of the network devices. The first example configuration 100 illustrates a daisy-chain port configuration, where a network 100 is connected to a first device 106 via a second port, and the device 106 is then connected via a first port to a second port of another device 104, which is then connected via a first port to another device 102. The device(s) act as both an endpoint with device specific functionality as well as Ethernet switch functionality. With this dual-function configuration, the network can provide network connectivity to multiple devices without the need of an additional, dedicated Ethernet switch by connecting additional devices to one of the ports on the previous device.

Another configuration which may be used in an enterprise network configuration with audio devices may be a redundant configuration 120 which redundancy into the network system. In general, this configuration will isolate the two network ports on a single device 102 from one another by installing them to the independent networks 110 and 112 on separate portions. In yet another example network configuration, a network may be setup as a media-isolation mode of operation. In some instances, an enterprise may not need or desire audio and/or video traffic on its primary data network. With the media-isolation configuration 140, the network device 102 functions as a device with one media port (1) to a media network 142 and one control port (2) to a control network 144. Typically, this configuration will include connecting the ports to different networks to guarantee media traffic is not sent on the main network.

According to example embodiments, the network device(s) will generally have two network RJ-45 ports that can be dynamically configured to operate differently based on the needs of the application. The port configurations may be stored in memory in managing computer device which is responsible for confirming the network configurations are setup correctly according to a set of predefined network port instructions. In general, there are three main possible modes of operation for the network devices of known devices, and those may include, redundant, daisy-chain and isolation mode. The devices may be known or unknown device types and depending on the configurations, the devices may be required to be known (i.e., familiar manufactured device) in order to confirm a specific network configuration is correct and if not then the configuration may be deemed incorrect.

One example device may be an amplifier. The two ports on the back of the amplifier may act as a two-port Ethernet switch. When the device(s) is connected directly to the network, the network may provide network connectivity to the devices in the chain downstream. This configuration enables configurations to not have to supply a dedicated Ethernet switch to connect with the other devices on the network. Each device in the chain configuration is relying on the device upstream to provide network connectivity to the network. The amplifier network device may also have "Network Loop Prevention" logic to avoid incorrect wiring when in a daisy-chain mode of operation. Without this logic, if a network switch was in a daisy-chain mode and had both its ports plugged directly into one Ethernet switch or, it could create network loop faults which would hang-up the devices and result in connectivity errors. This logic will not permit this configuration and will generate a fault notification with a description of the condition to be created and shared with a reporting network device, such as a management server.

The firmware stored in the server and/or lead network device may utilize a Link Layer Discovery Protocol (LLDP) to constantly monitor what is connected to both network ports. If, at any time, when both ports are connected and are operational, one of the ports may not be an authorized device, and thus the daisy-chain mode will not be permitted, and a fault will be generated. If the network is already in a daisy-chain mode of operation and this condition of an unknown device occurs, the device will force itself into an isolation mode and generate a fault condition.

Figure 2:
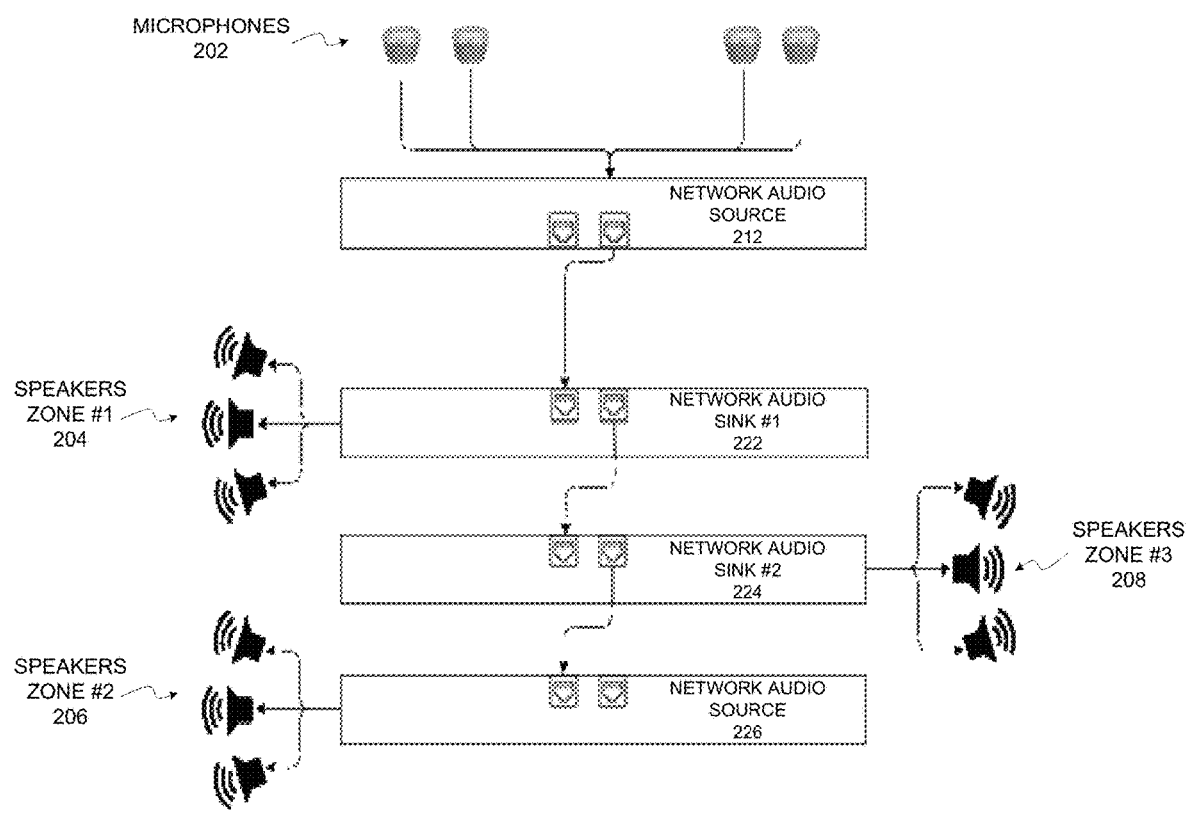
FIG. 2 illustrates a detailed example of a daisy-chain network configuration according to example embodiments.

FIG. 2 illustrates a detailed example of a daisy-chain network configuration according to example embodiments. Referring to FIG. 2, the configuration 200 includes a daisy-chain scenario with a network source of audio 212, and three network sinks 222, 224 and 226 as additional network devices. The network audio source 212 includes an interface for input and output microphones 202 which may be wired and affixed to a ceiling. The speakers 204/206/208 (i.e., loudspeakers) which output audio at various locations based on the input of the microphones or other audio feeds, may be individually powered and controlled by network audio sinks 222/224/226. In this daisy-chain configuration, the cables are connected from one port to another in an alternating order of an output port to an input port from ports 1 to 2. One network audio transmitting device (i.e., audio source 212) is installed on the network by having one of its RJ-45 network ports connected to one of the network ports on the first network audio sink 222. Associated analog input devices are attached (e.g., microphones) to the source 212.

The first audio network sink's 222 open RJ-45 is connected to one of the second network audio sinks 224 RJ-45 ports. Associated analog outputs (speakers) are attached to the sinks. The second network sink's 224 open RJ-45 is connected to one of the third network audio sink's 226 RJ-45 ports. Associated analog outputs (speakers) are hooked up. The daisy-chain configuration is now setup, and the controlling device now configures the network audio input and network audio output devices to act in daisy-chain mode. This include the network audio source 212 transmitting audio and control traffic over its RJ-45 port to the first network audio sink 222. The first network audio sink 222 receives audio and control traffic on its connection port to the network source and renders the received audio traffic on its connected analog speakers. The network audio and control traffic is forwarded on to the second network audio sink 224, which receives the audio and control traffic on its connected port and renders the received audio on its connected analog speakers 208. It forwards the received audio and control traffic on to the third network audio sink 226, which receives the audio traffic from the second network audio sink 224 and renders it on its connected analog speakers 206.

Figure 3:
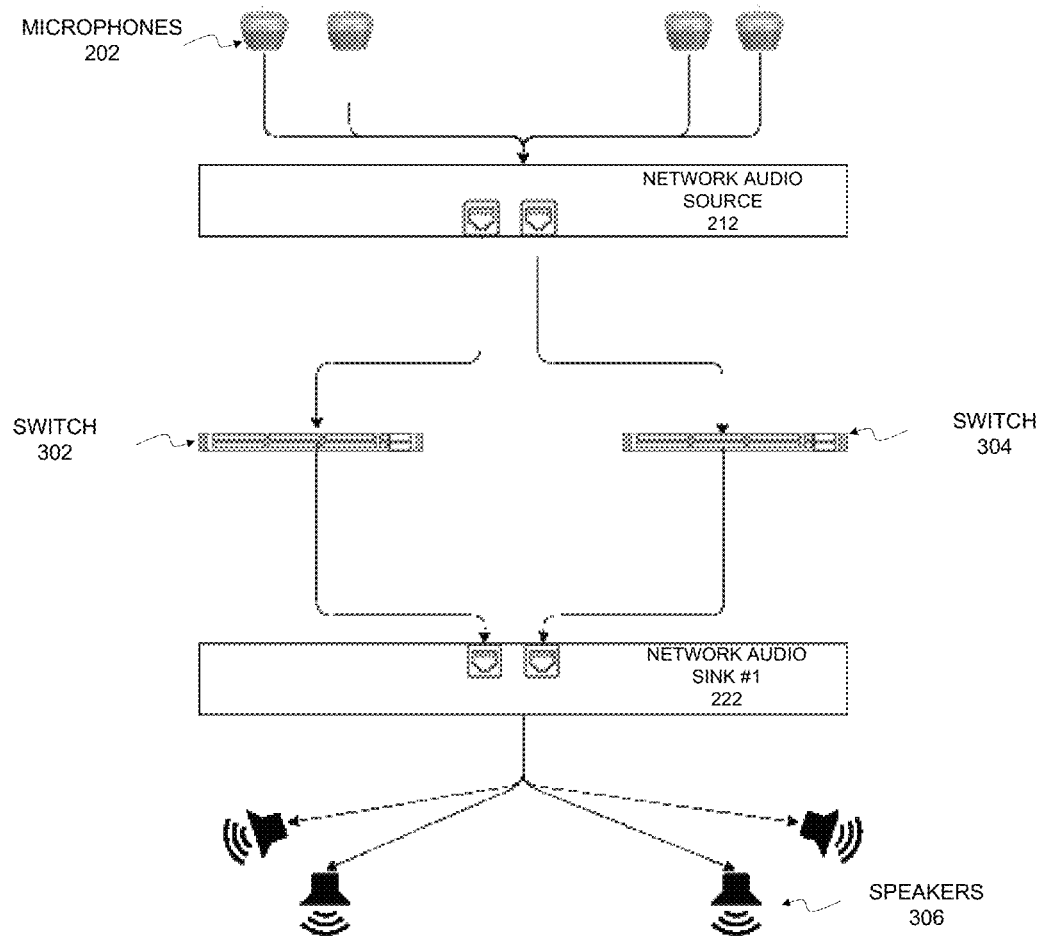
FIG. 3 illustrates a detailed example of a redundant network configuration according to example embodiments.

FIG. 3 illustrates a detailed example of a redundant network configuration according to example embodiments. Referring to FIG. 3, the configuration 300 includes the same microphones 202 and network source 212 device however, the switches 302 and 304 demonstrate two separate network paths used to provide audio and control data to the sink 222 for speaker output 306. This example represents a redundancy scenario where a port failure or a switch failure will not affect the outcome of the other port or switch since both are providing the same content to an end device 222.

Figure 4:
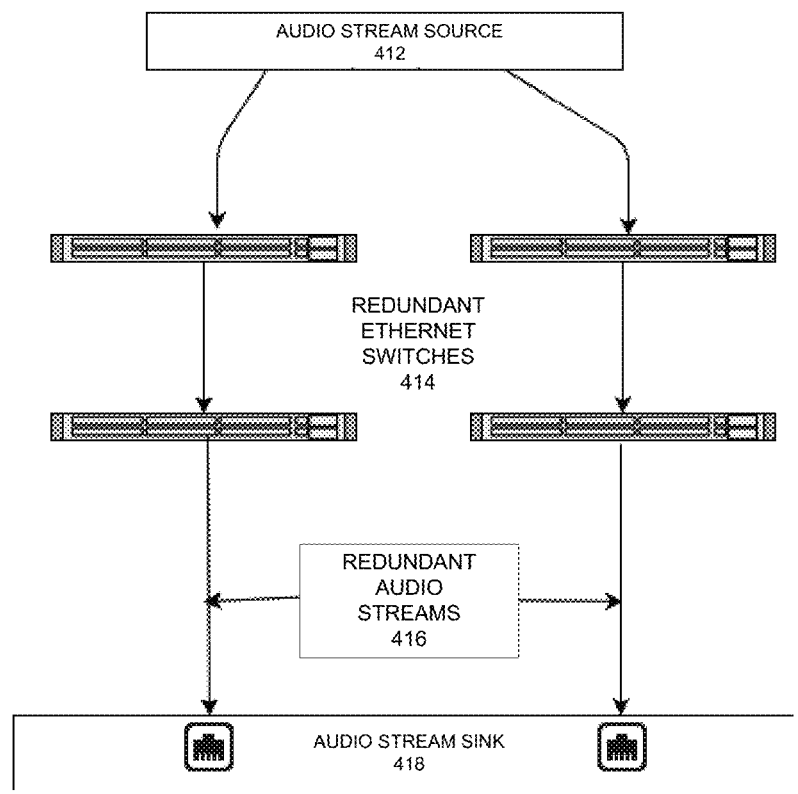
FIG. 4 illustrates another detailed example of a redundant network configuration according to example embodiments.

FIG. 4 illustrates another detailed example of a redundant network configuration according to example embodiments. Referring to FIG. 4, the configuration 400 provides an audio stream source 412 with various redundant switches 414 connected to more than one port of the source. In this example, there is one network audio transmitting device 412 which is installed on the network by having both its RJ-45 network ports connected to redundant ethernet switches 414. One receiving audio device (audio sink 418) is installed by having both its RJ-45 ports connected to the redundant ethernet switches 414. The RJ-45 network ports on the audio source 412 and the audio sink 418 may be configured to operate in redundancy mode (e.g., network ports on both devices to change roles if necessary). The redundant network audio flows from the audio source to the audio sink on redundant links 416 removing any single point of failure on the network from dropping audio.

Figure 5:
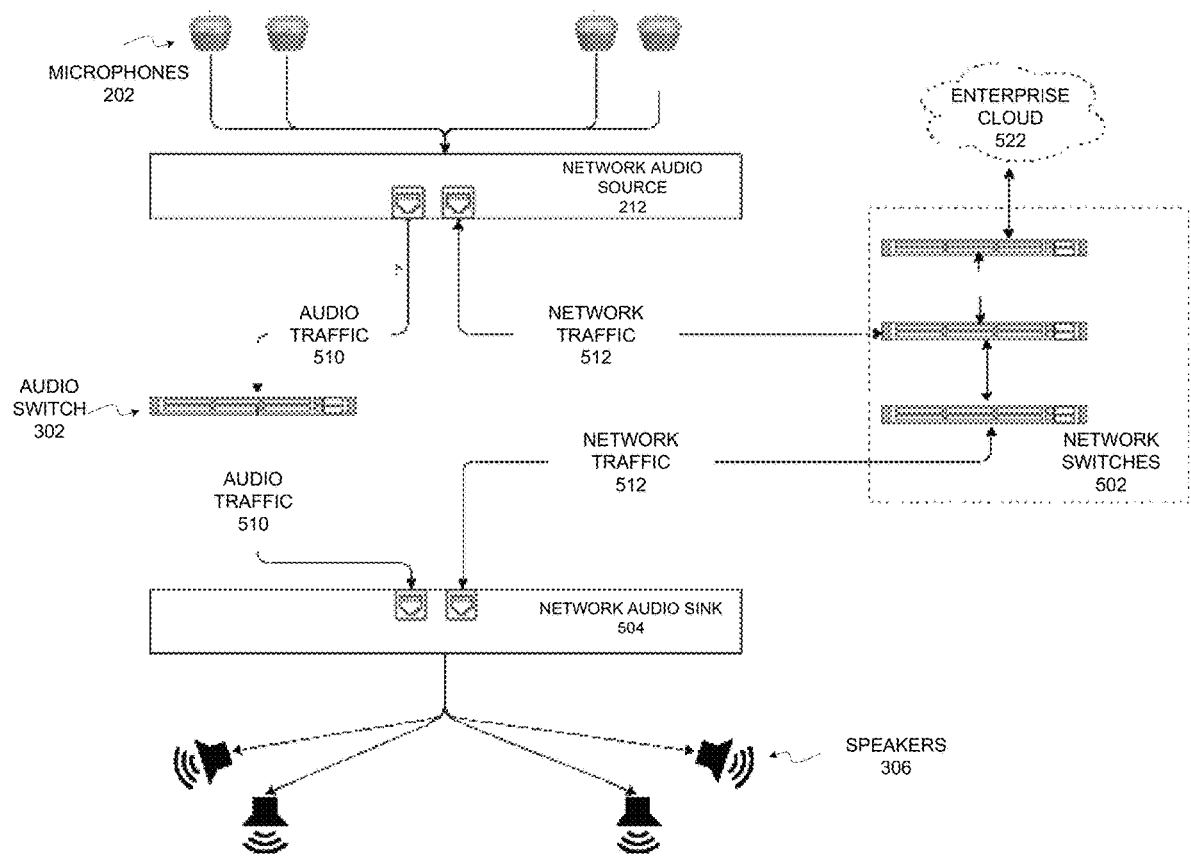
FIG. 5 illustrates a detailed example of a fault isolation network configuration according to example embodiments.

FIG. 5 illustrates a detailed example of a fault isolation network configuration according to example embodiments. Referring to FIG. 5, the configuration 500 includes a media isolation scenario with a network audio source 212, a network audio sink 504, with inputs form audio traffic 510 on one link, and all other network traffic 512 on the other link. The network data may be enterprise network traffic from network switches communicating to a network cloud 522. In operation, the network may plug one RJ-45 port on the network audio source to dedicated audio traffic on the Ethernet switch. The other port is the control port to an enterprise network. Analog inputs may be used to provide microphones 202. In a setup configuration, one RJ-45 jack is hooked up to a network audio sink for an audio traffic only Ethernet switch and the other RJ-45 jack to the enterprise network 522 and switches 502. Analog output devices (speakers 306) are also setup to the sink 504. The devices are setup to isolate audio/video data from the control network data. The network audio source 212 and network audio sink 504 may have their network ports configured to operate in isolation mode. Audio data only is sent out the provisioned audio port, and all control data is transmitted over the control only port, thus isolating the audio/video data from the normal network traffic.

Figure 6:
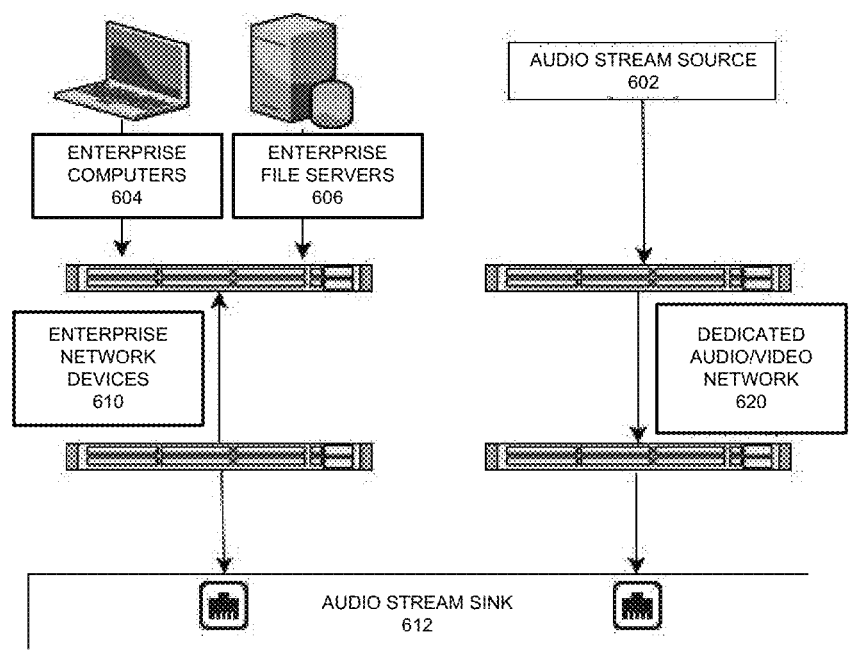
FIG. 6 illustrates another detailed example of a fault isolation network configuration according to example embodiments.

FIG. 6 illustrates another detailed example of a fault isolation network configuration according to example embodiments. In FIG. 6, the configuration 600 demonstrates how the enterprise network may include various devices 610, such as enterprise computers 604 and file server 606, etc., all of which operate on the enterprise network portion of the sink 612. The other port of the device is connected to a dedicated audio/video network 620 with an audio stream source 602.

Figure 7:
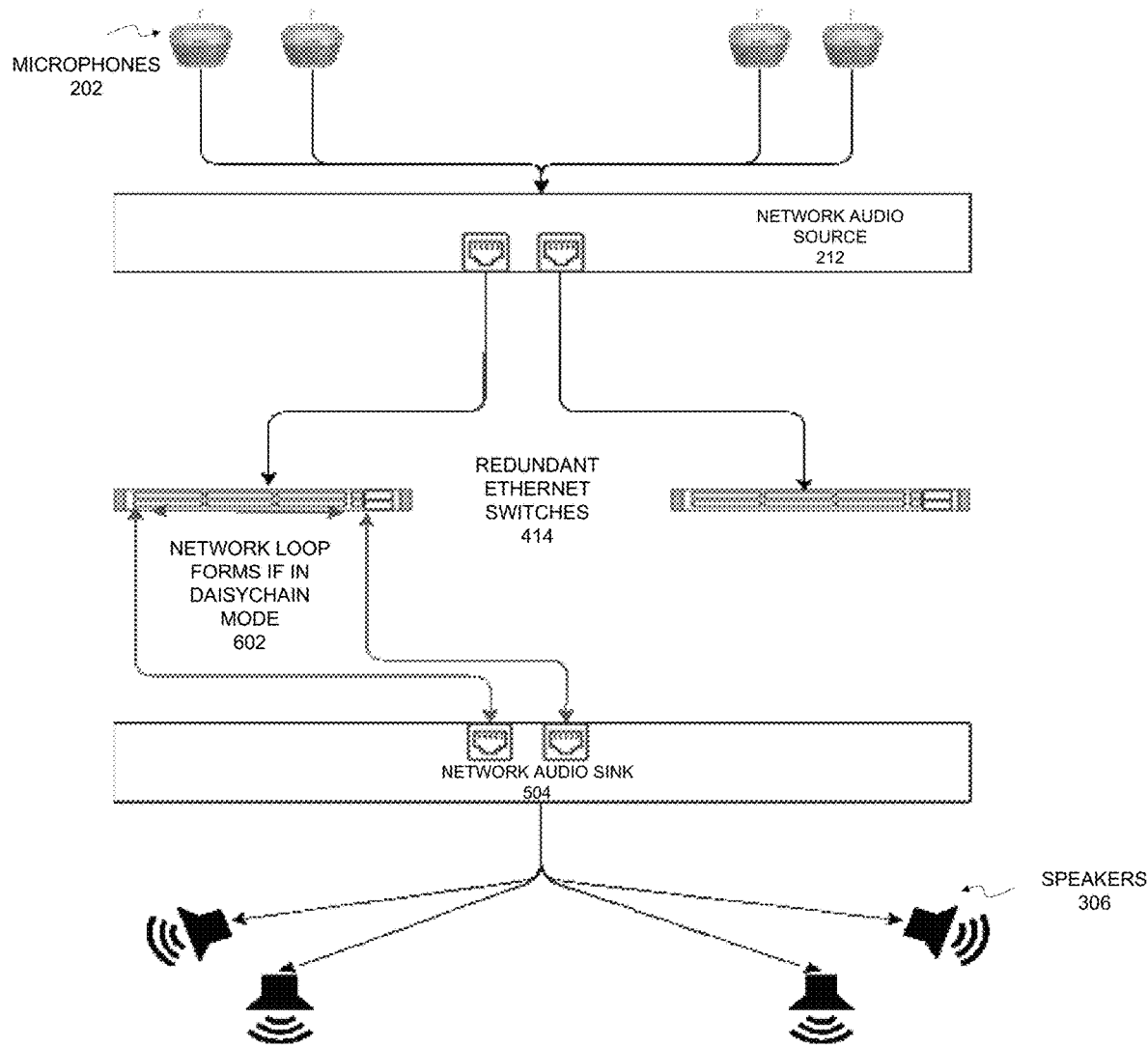
FIG. 7 illustrates a detailed example of a daisy-chain configuration network with incorrect wiring according to example embodiments.

FIG. 7 illustrates a detailed example of a daisy-chain configuration network with incorrect wiring according to example embodiments. Referring to FIG. 7, the configuration 700 provides an example of actions taken when the network management application and device detect an incorrect setup. In this daisy-chain induced network loop scenario, a network engineer may incorrectly wire the device so that the daisy-chain mode can lead to accidental network loops. If the installers intent is a redundant connection but they accidently select daisy-chain or the management device is setup to identify daisy-chain, but the configuration is wired as a redundant connection, the accidental network loop condition may occur causing packet storms and network errors. This may be detected, and an error may occur so that an error notification is created and sent to the management device (not shown).

Figure 8:
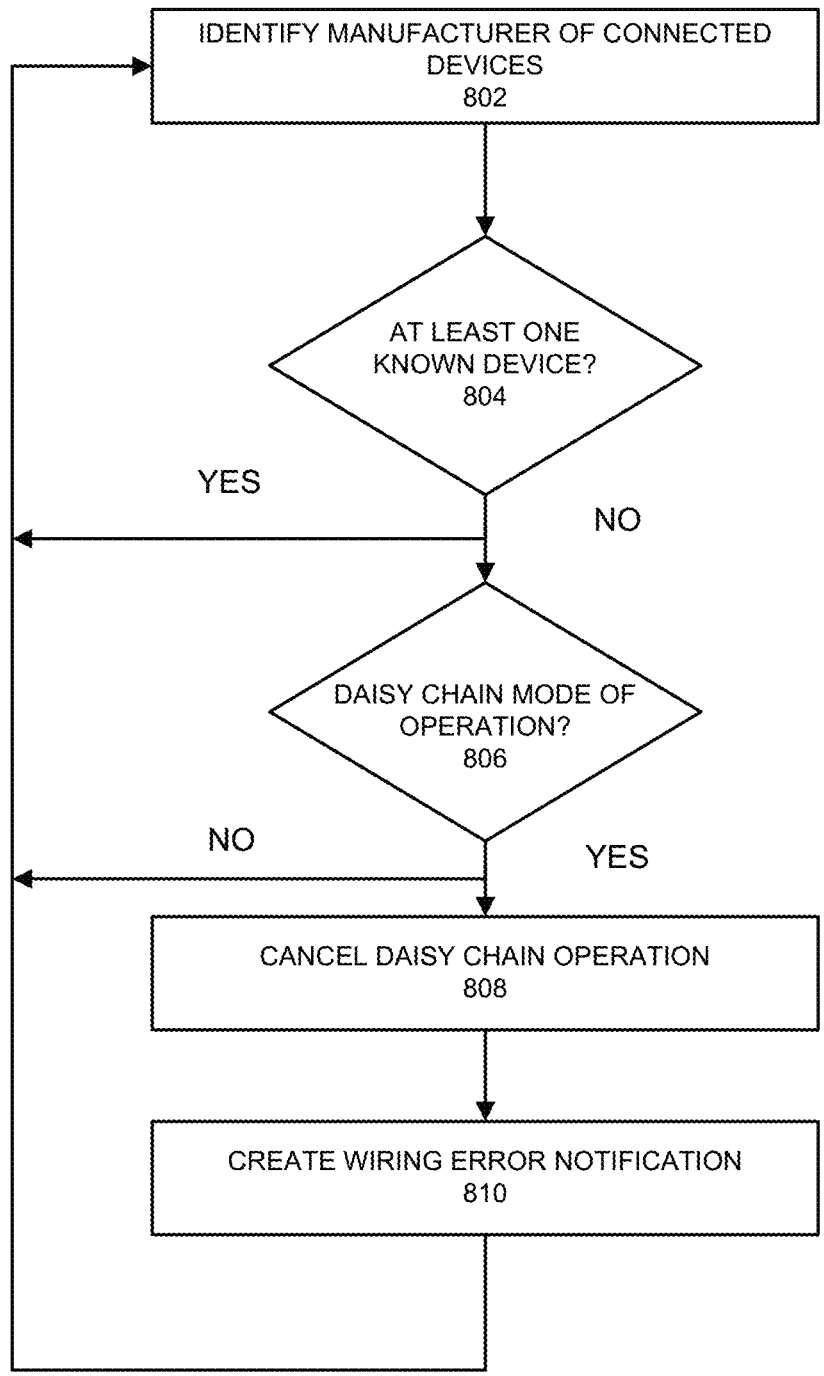
FIG. 8 illustrates a detailed flow diagram example process according to example embodiments.

FIG. 8 illustrates a detailed flow diagram example process according to example embodiments. Referring to FIG. 8, the configuration 800 provides a method of operation where the managing device can identify a network configuration, compare the configuration to an expected configuration, and determine whether to create an error notification when the configuration fails or is determined to be incorrect.

In general, the device may be identified 802 for a particular hardware profile, such as a hardware address or other indication that indicates whether the device is known 804 or unknown. When the device is known is in communication with the managing device, the network configuration will include the known device providing an indicator of acknowledgement such as a hardware ID, a flag, a code, etc., in the form of a data packet or message. The process is completed for that device and other devices may be checked in subsequent operations for compliance and determine whether the network configuration setup in the managing device is correct. Next, in the case of a daisy-chain mode of operation, if the network is not in daisy-chain mode, the process may be deemed correct since the network failures occur in a daisy-chain mode of operation vs. a redundancy mode and/or isolation mode of operation. If the daisy-chain mode of operation is selected 806, as stored in the managing device memory, then the lack of known devices may cause an automatic daisy-chain error indication to occur. This may cause the daisy-chain operation to be cancelled 808. When the operation is cancelled the managing device may create a wiring error notification 810.

For a redundant network mode of operation, the network audio source may be plugged in so that its RJ-45 ports are plugged in to two different (redundant) Ethernet switches and all analog inputs (microphones) are plugged in as well. The network audio sink is wired so that both its RJ-45 network ports are plugged in to the same switch, and all analog outputs (speakers) are plugged in as well. In this case, when a network operator (incorrectly) puts the network audio sink into a daisy-chain mode of connections, a network loop may occur. The loop prevention algorithm of the application of the managing device may detect the network loop condition and reject the daisy-chain mode request, causing a fault indication notifying the operator that an incorrect wiring condition exists.

Figure 9A:
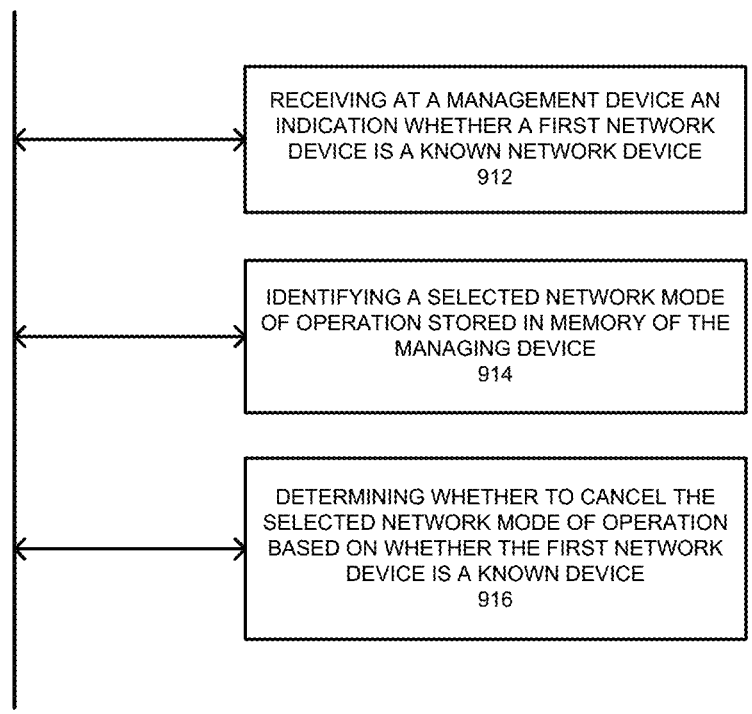
FIG. 9A illustrates another detailed flow diagram example process according to example embodiments.

FIG. 9A illustrates another detailed flow diagram example process according to example embodiments. Referring to FIG. 9A, the example method 900 includes a receiving at a managing device an indication whether a first network device is a known network device 912, identifying a selected network mode of operation stored in memory of the managing device 914, and determining whether to cancel the selected network mode of operation based on whether the first network device is a known device 916. In one example, the selected network mode of operation is a daisy-chain network mode of operation. The daisy-chain network mode of operation includes one port on the first network device being connected to one port on a second network device. The first network device is communicatively coupled to the managing device via one additional port on the first network device, and a second port on the second network device is connected to one or more additional network devices. The method also includes identifying the first network device is not a known device and cancelling the selected network mode of operation, and creating an error notification indicating the cancellation.

Figure 9B:
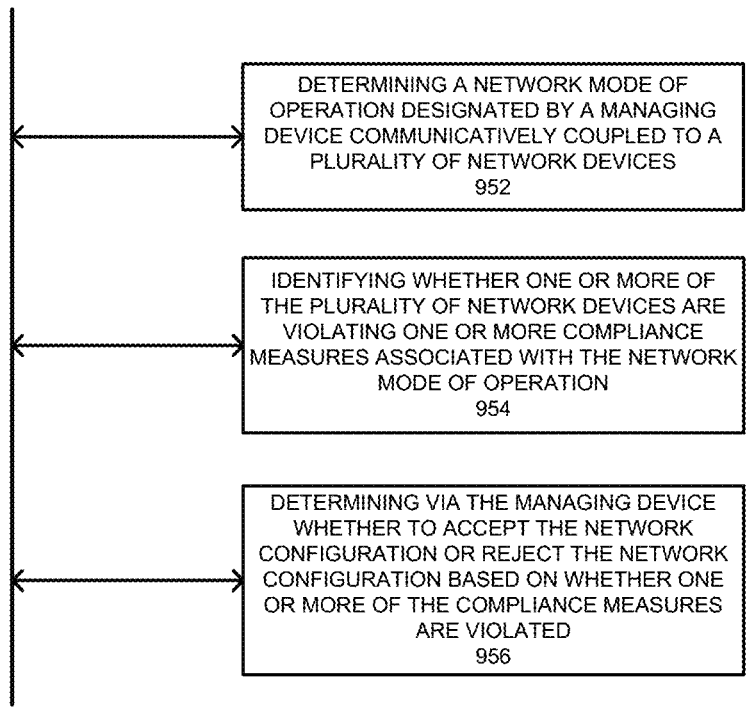
FIG. 9B illustrates another detailed flow diagram example process according to example embodiments.

FIG. 9B illustrates another detailed flow diagram example process according to example embodiments. Another example method of operation includes a method 950 that includes determining a network mode of operation designated by a managing device communicatively coupled to a plurality of network devices 952, identifying whether one or more of the plurality of network devices are violating one or more compliance measures associated with the network mode of operation 954, and determining via the managing device whether to accept the network configuration or reject the network configuration based on whether one or more of the compliance measures are violated 956. The compliance measures may include one or more ports of a network device being connected to one or more ports of another network device, and one or more ports of the another device being connected to one or more ports of an additional device, or, two or more ports of the network device being connected to two respective separate ports of the another network device and the additional network device. In this example, the network mode of operation is one or more of a daisy-chain network mode of operation, a redundant network mode of operation and an isolated network mode of operation depending on the port configurations and the known devices being identified.

The daisy chain network mode of operation requires two or more ports of at least one of the plurality of network devices being connected to two different network devices. The redundant network mode of operation requires two or more ports of a network device being connected to two different network devices which both connect to a same network device. The determined network mode of operation is violated when one or more of the plurality of network devices violates one or more of the compliance measures. When the network mode of operation is violated, the selected network mode of operation is cancelled and an error notification indicating the cancellation is created.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 10 illustrates an example computer system architecture 1000, which may represent or be integrated in any of the above-described components, etc.

Figure 10:
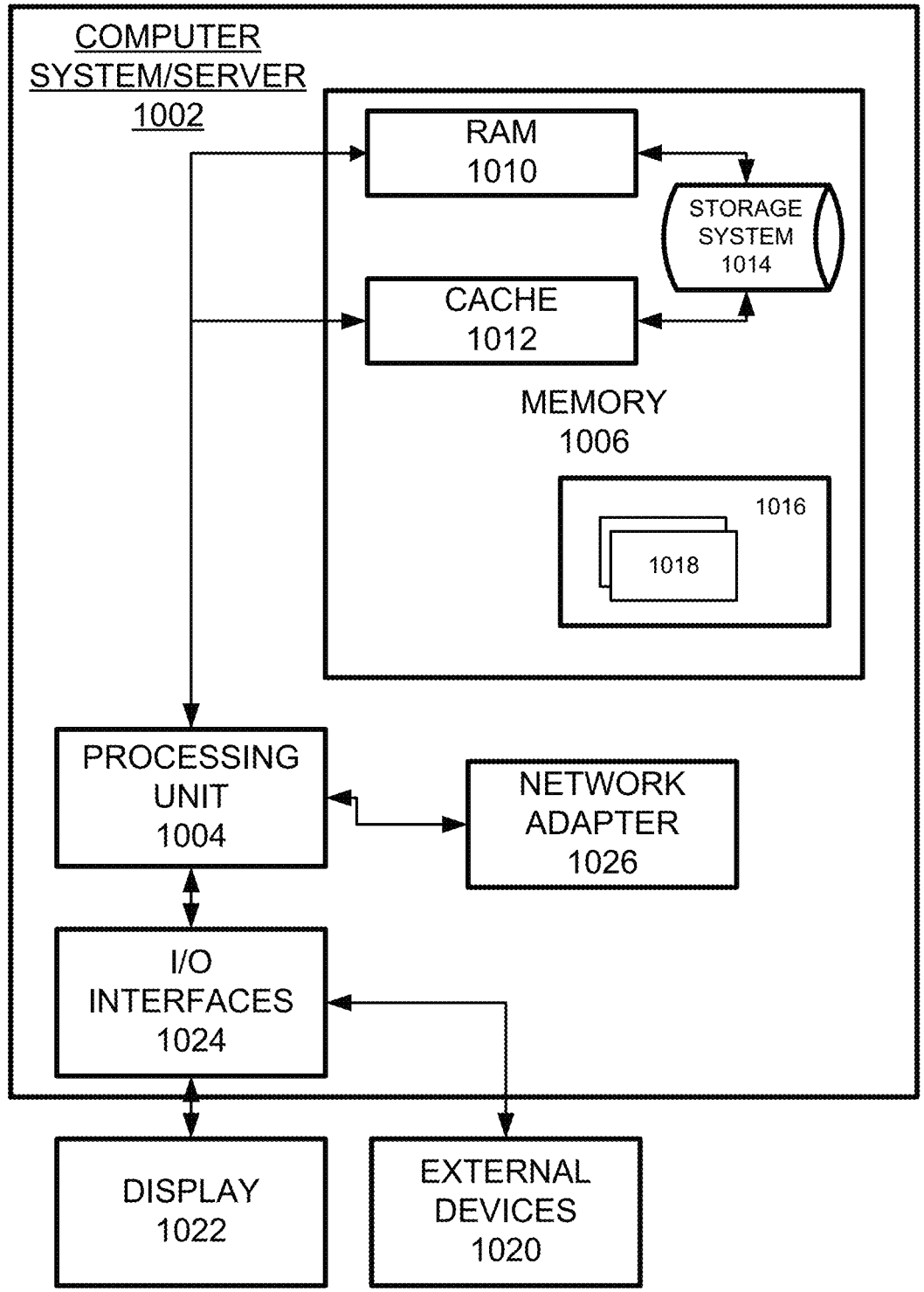
FIG. 10 illustrates an example system entity configured to perform one or more operations corresponding to the example embodiments.

FIG. 10 is not intended to suggest any limitation as to the scope of use or functionality of embodiments of the application described herein. Regardless, the computing node 1000 is capable of being implemented and/or performing any of the functionality set forth herein.

In computing node 1000 there is a computer system/server 1002, which is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1002 in cloud computing node 1000 is shown in the form of a general-purpose computing device. The components of computer system/server 1002 may include, but are not limited to, one or more processors or processing units 1004, a system memory 1006, and a bus that couples various system components including system memory 1006 to processor 1004.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media. System memory 1006, in one embodiment, implements the flow diagrams of the other figures. The system memory 1006 can include computer system readable media in the form of volatile memory, such as random-access memory (RAM) 1010 and/or cache memory 1012. Computer system/server 1002 may further include other removable/non-removable, volatile/non-volatile computer system storage media. By way of example only, storage system 1014 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1006 may include at least one program product having a set (e.g., at least one) of program modules that are configured to carry out the functions of various embodiments of the application.

Program/utility 1016, having a set (at least one) of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1002 may also communicate with one or more external devices 1020 such as a keyboard, a pointing device, a display 1022, etc.; one or more devices that enable a user to interact with computer system/server 1002; and/or any devices (e.g., network card, modem, etc.) that enable computer system/server 1002 to communicate with one or more other computing devices. Such communication can occur via I/O interfaces 1024. Still yet, computer system/server 1002 can communicate with one or more networks such as a local area network (LAN), a general wide area network (WAN), and/or a public network (e.g., the Internet) via a network adapter. The network adapter communicates with the other components of computer system/server 1002 via a bus. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
receiving at a managing device an indication whether a first network device is a known network device;
identifying a daisy-chain mode as a selected network mode of operation stored in memory of the managing device wherein the daisy-chain mode comprises one port on the first network device being connected to one port on a second network device and another port of the first network device being connected to the managing device;
determining whether to cancel the selected network mode of operation based on whether the first network device is a known device; and
cancelling the daisy-chain network mode of operation when the first network device is not a known device.

2. The method of claim 1, wherein a second port on the second network device is connected to one or more additional network devices.

3. The method of claim 1, comprising:
identifying the first network device is not a known device.

4. The method of claim 3, comprising:
cancelling the selected network mode of operation; and
creating an error notification indicating the cancellation.

5. An apparatus comprising:
a receiver configured to receive at a managing device an indication whether a first network device is a known network device;
a processor configured to
identify a daisy chain mode as a selected network mode of operation stored in memory of the managing device wherein the daisy-chain mode comprises one port on the first network device being connected to one port on a second network device and another port of the first network device being connected to the managing device;
determine whether to cancel the selected network mode of operation based on whether the first network device is a known device; and
cancel the daisy-chain network mode of operation when the first network device is not a known device.

6. The apparatus of claim 5, wherein a second port on the second network device is connected to one or more additional network devices.

7. The apparatus of claim 5, wherein the processor is further configured to identify the first network device is not a known device.

8. The apparatus of claim 7, wherein the processor is further configured to cancel the selected network mode of operation, and create an error notification indicating the cancellation.

9. A non-transitory computer readable storage medium configured to store instructions that when executed cause a processor to perform:
receiving at a managing device an indication whether a first network device is a known network device;
identifying a daisy chain mode of operation as a selected network mode of operation stored in memory of the managing device, wherein the daisy-chain mode comprises one port on the first network device being connected to one port on a second network device and another port of the first network device being connected to the managing device;
determining whether to cancel the selected network mode of operation based on whether the first network device is a known device; and
cancelling the daisy-chain network mode of operation when the first network device is not a known device.

10. The non-transitory computer readable storage medium of claim 9, wherein a second port on the second network device is connected to one or more additional network devices.

11. The non-transitory computer readable storage medium of claim 9, wherein the processor is further configured to perform:
identifying the first network device is not a known device.

* * * * *